United States Patent [19]
Bryant

[11] Patent Number: 4,847,834
[45] Date of Patent: Jul. 11, 1989

[54] LOCAL AREA NETWORK
[75] Inventor: Stewart F. Bryant, Redhill, England
[73] Assignee: U.S. Philips Corp., New York, N.Y.
[21] Appl. No.: 143,211
[22] Filed: Jan. 7, 1988

Related U.S. Application Data
[63] Continuation of Ser. No. 790,277, Oct. 22, 1985.

[30] Foreign Application Priority Data
Nov. 14, 1984 [GB] United Kingdom ............... 8428713

[51] Int. Cl.$^4$ ............................................. H04J 3/24
[52] U.S. Cl. ................................. 370/85; 340/825.07
[58] Field of Search .................... 364/717; 370/85, 89,
    370/90, 94, 95, 92; 340/825.06, 825.07, 825.52

[56] References Cited
U.S. PATENT DOCUMENTS

| | | | |
|---|---|---|---|
| 4,479,112 | 10/1984 | Hirsch | 340/365 VL |
| 4,506,360 | 3/1985 | Kryskow, Jr. et al. | 370/85 |
| 4,630,201 | 12/1986 | White | 364/717 |
| 4,667,192 | 5/1987 | Schmid et al. | 370/85 |
| 4,680,583 | 7/1987 | Grover | 340/825.52 |

FOREIGN PATENT DOCUMENTS

| | | | |
|---|---|---|---|
| 2075229 | 11/1981 | United Kingdom | 364/717 |
| 2094526 | 9/1982 | United Kingdom | 364/717 |

Primary Examiner—Douglas W. Olms
Assistant Examiner—Melvin Marcelo
Attorney, Agent, or Firm—Thomas A. Briody; Algy Tamoshunas; Leroy Eason

[57] ABSTRACT

A local area network including a controller connected to a transmission medium. A plurality of terminals are connected to the transmission medium to initiate a request for an address. Each of the terminals includes a means for locally generating and storing a random number. The random number is transmitted with an address request to the controller. The controller will assign an address to the requesting terminal and append to the assigned address the received random number. When the terminal receives the assigned address and determines that the appended random number is the same as that locally generated, the address is identified as the address of the requested terminal.

8 Claims, 2 Drawing Sheets

LOCAL AREA NETWORK

This is a continuation of application Ser. No. 790,277 filed Oct. 22, 1985.

The invention relates to a local area network comprising a controller and a plurality of terminals connected to a common transmission medium; in which each terminal comprises means for requesting an address from the controller, means for generating a random number to be transmitted to the controller together with the address request, and means for storing the random number transmitted. The controller comprises means for allocating a unique address to each terminal connected to the transmission medium in response to an address request from that terminal and means for transmitting the allocated address to that terminal together with the random number generated by that terminal; and each terminal further comprises means for comparing the random number associated with the address transmitted by the controller with the random number associated with its address request and accepting the allocated address if the random numbers coincide.

Such a local area network is specified in CCITT Recommendation 1441 which requires telephone and data terminals to generate a random 16 bit number as part in an initialisation sequence enabling randomly selected identical terminals to be connected to a common transmision medium. The Recommendation does not specify how this number is to be generated but random number generators of various forms are known, for example pseudo-random sequence generators comprising clocked shift registers with selected stages fed back. Thus the task of generating a random number does not present significant problems to the worker skilled in the art. However, it is possible, particularly after a "power down" situation that two or more terminals will generate the same random number and hence each assume that an address allocated by the controller is for them. The controller may never discover that this situation has arisen and even if it does there is no procedure which will allow the controller to correct the situation since any instruction sent by the controller will be acted upon by all the terminals possessing that address and random number in an identical fashion.

SUMMARY OF THE INVENTION

It is an object of the invention to provide a local area network as set forth in the opening paragraph in which the effect of this problem is mitigated.

The invention provides a local area network as set forth in the opening paragraph characterised in that each terminal comprises means for generating a new random number whenever a human interaction of a given kind is made with that terminal.

By combining a human interaction with the random number generator a reduced likelihood of two terminals generating the same random number can be achieved and a mechanism for escaping from a situation in which two terminals have effectively locked random number generators is available. Thus use is made of the most random feature of the system, which is the human operator, to reduce the possibility of two terminals retaining the same random number for an indefinite period.

When the local area network comprises telephone terminals a new random number may be generated each time a telephone call is initiated under human control. Thus operation of the hook switch could be detected and used to generate a new random number.

When the local area network comprises data terminals a new random number may be generated each time an operator logs on and/or off. Of course any other operator action could be used to initiate generation of a new random number but preferably the action should be a normal operation of the terminal and not an additional action specific to generating an address or random number for the terminal.

The means for generating the random number may operate continuously and its output may be read into a store whenever a human interaction of a given kind is made with the terminal, the store holding the new random number. The means for generating the random number may comprise a continuously cycling counter or a pseude-random sequence generator.

Alternatively the means for generating the random number may comprise a counter driven by a clock generator, the counter outputs being connected to preset inputs of a clocked pseudo-random sequence generator of the feedback shift register type, the preset inputs being activated in response to a human interaction with the terminal.

An embodiment of the invention will now be described, by way of example, with reference to the accompanying figures:

FIG. 1 shows in block schematic form a local area network according to the invention, FIG. 2 shows in block schematic form an embodiment of a controller suitable for use in the local area network of FIG. 1, and FIG. 3 shows in block schematic form a terminal suitable for use in the local area network of FIG. 1.

DESCRIPTION OF THE PREFERRED EMBODIMENT

Figure 1:
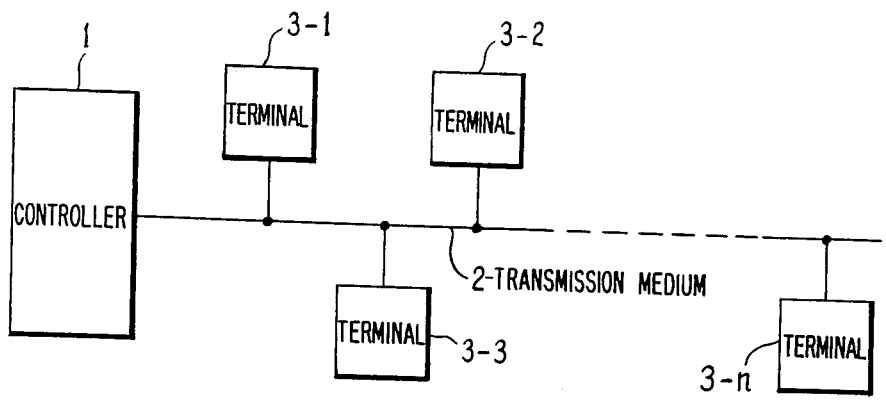

The local area network shown in FIG. 1 comprises a controller 1 which may be part of a PABX, a transmission medium 2 which, for example, may be in bus, ring, or loop form and may comprise metallic conductors or optical fibres, and a plurality of terminals 3-1 to 3-n, which may be telephone or data terminals.

Each terminal 3-1 to 3-n includes a random number generator which is arranged to produce a new random number each time human interaction of a given kind is made with that terminal. This interaction can take many forms. For example, if the terminal is a telephone terminal operation of the hook switch could be monitored and used to cause a new random number to be generated. This enables the function to be performed in a manner which does not require the operator to perform any special tasks for the purpose of generating new random numbers. Again if the terminal is a data terminal the logging on and/or off of an operator could be monitored and used to cause a new random number to be generated. Any other human interaction with a terminal could be monitored and used to cause the generation of a new random number and clearly all interactions or any sub-set of such interactions could be used to generate new random numbers.

When a terminal is connected to the transmission medium or when power is applied to the system an initialisation procedure is carried out during which the terminal or terminals ask for an address allocation from the controller. The request for an address is transmitted together with a random number (of a given bit length, for example 16). This is acted upon by the controller which allocates an address and transmits this address to the terminal together with the random number it received with the address request. Consequently by comparing the transmitted and received random number the terminal can determine whether or not the allocated address is meant for itself. In the majority of instances the random number will provide a sufficient distinction between the terminals so that each terminal receives a unique address. However, particularly in the case of a restoration of the power supply after an interruption, the random number generators of more than one terminal may produce identical sequences of random numbers, i.e. counters or pseudo-random sequence generators adopting a common switch-on state and incrementing identically. When this occurs and when, also, simultaneous address assignment requests are made it is possible for more than one terminal to assume that an allocated address is meant for itself. This is particularly so if the initial address allocation request is automatically generated, which is desirable in that until an address has been allocated the system does not know of the terminals existence and hence no third party can initiate a call to that terminal.

Figure 2:
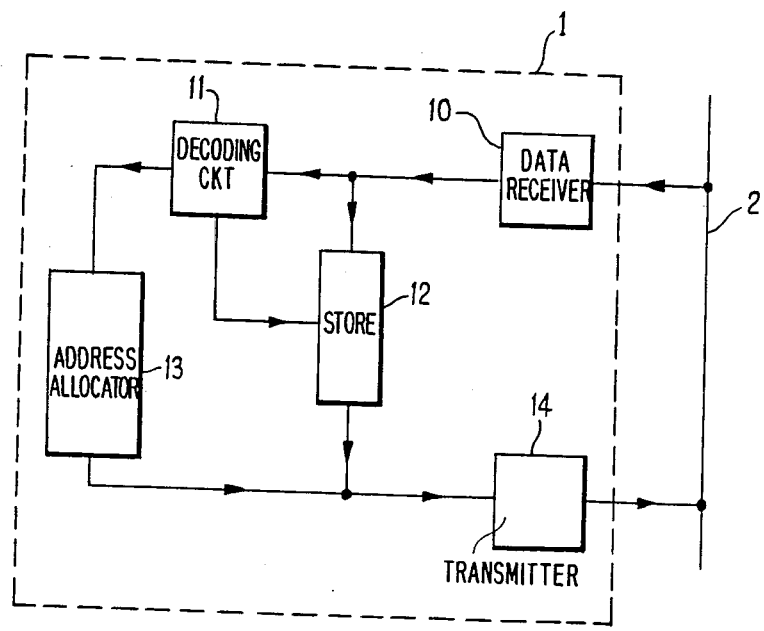

FIG. 2 shows in block schemtic form that part of the controller which is concerned with allocating addresses to the terminals. The controller 1 comprises a data receiver 10 which detects the data on the transmission medium 2 and converts it into a suitable form for further processing. The output of the receiver 10 is fed to a decoding circuit 11 which determines whether an address allocation has been requested by a terminal and, if so, produces a first signal which causes the accompanying random number to be read into a store 12 and a second signal which is fed to an address allocator 13. The address allocator allocates an appropriate address according to preset rules and feeds the address to a transmitter 14 whose output is coupled to the transmission medium 2. The output of the store 12 is also fed to the transmitter 14 so that the controller 1 transmits the allocated address plus the random number. In theory the address and random number may be transmitted in parallel or serially but in practice serial transfer is normally used to economise on the transmission medium, e.g. number of wires or bandwidth required.

The controller 1 may perform other operations besides the initial address allocation to the terminal, for example a continuous monitoring of the terminals to check their address allocation, it may control communication between terminals connected to the transmission medium, or it may control communication between the network and the outside world. Thus the decoder 11 will recognise other requests from a terminal and produce further outputs to enable the controller to take appropriate action.

Figure 3:
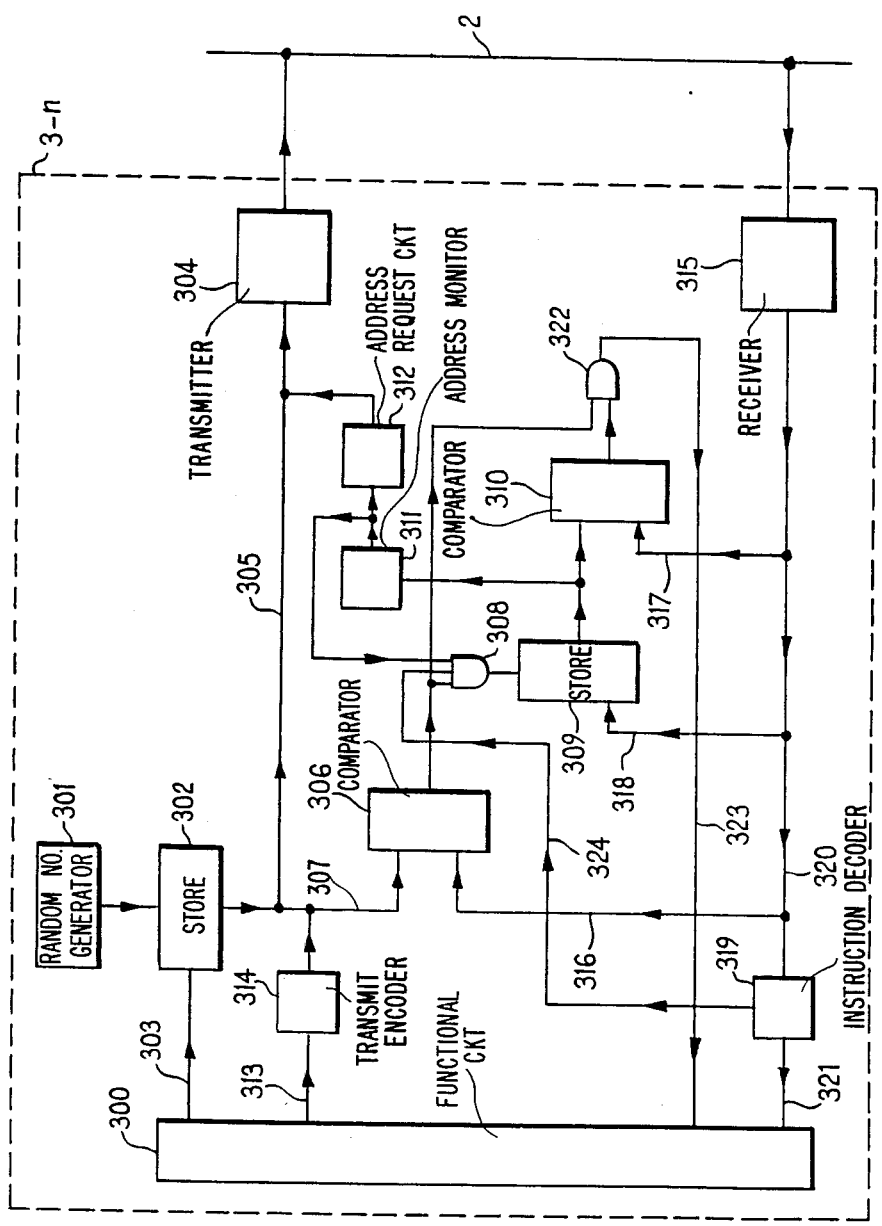

FIG. 3 shows a terminal 3-n suitable for use in the network of FIG. 1. The terminal 3-n comprises functional circuitry 300 which may provide speech or data processing circuitry which will be specific to that type of terminal. The remainder of the terminal 3-n is concerned with interfacing the functional circuitry 300 with the network and provides the addressing and communication means. A random number generator 301, which may be of any convenient form, for example a pseudo random sequence generator formed by a clocked shift register having selected stages fed back, has its output connected to a random number store 302. The store 302 may be an n-bit latch where n is the number of bits required for the random number. The random number generator 301 may be continuously cycling the output being read into the store 302 under the control of a signal generated in the functional circuitry 300 as a result of a human interaction with the terminal and fed to a read input of the store 302 over a line 303. The output of the store 302 is fed to a transmitter 304 over a line 305 and to a first input of a comparator 306 over a line 307. The output of the comparator 306 is connected to a first input of an AND gate 308 whose output is connected to a write input of a store 309 which is intended for storing the address allocated to the terminal. The output of the store 309 is connected to a first input of a comparator 310 and to the input of an address monitor 311 whose output is connected to the input of an address request circuit 312. The output of the address request circuit 312 is connected to the transmitter 304 while the output of the address monitor 311 is further connected to a second input of the AND gate 308. The functional circuitry 300 has a further output which is fed via a line 313 to a transmit encoder 314 whose output is connected to the transmitter 304 via line 305.

The output of the transmitter 304 is connected to the transmission medium 2 as is the input of a receiver 315. The output of the receiver 315 is fed to a second input of the comparator 306 via a line 316, to a second input of the comparator 310 via a line 317, to the input of the store 309 via a line 318, and to the input of an instruction decoder 319 via a line 320. The output of the instruction decoder 319 is fed to an input of the functional circuitry 300 via a line 321 and to a third input of the AND gate 308 via a line 324. The output of the comparator 306 is further fed to a first input of an AND gate 322, while the output of the comparator 310 is fed to a second input of the AND gate 322, the output of AND gate 322 being fed via a line 323 to a further input of the functional circuitry 300.

The operation of the terminal 3-n is as follows. Initially the store 309 will contain no information and this state is monitored by the circuit 311 which causes the address request circuit 312 to transmit a request to the controller for the allocation of the address. This request, which is in the form of a binary code, is accompanied by a random number. Consequently if two terminals transmit an address allocation request simultaneously they are able to determine which has been allocated the address, since the controller transmits the random number associated with the address. The random number is generated by the random number generator 301 and is written into the random number store 302 whenever a given human interaction with the terminal takes place. This can be either with ever interaction or with a selected sub-set of such interactions. Thus whenever a human interaction with the terminal takes place the functional circuitry 300 produces a signal on line 303 which causes the output of the random number generator 301 to be read into the random number store 302. With this arrangement the random number generator 301 is cycled continuously. It would alternatively be possible to cause the random number generator 301 to be preset by each interaction or to split the generator into two portions one of which seeds the other with its output whenever an interaction takes place. Thus a counter driven by a high speed clock could have its outputs connected to preset inputs of a pseudo random number generator of the clocked feedback shift register type, the preset inputs being activated by a signal generated in response to a human interaction.

The output of the random number store 302 is compared with the random number received over the transmission medium 2 and processed by the receiver 315 in the comparator 306. If the two random numbers are identical the comparator 306 produced an output which, via the AND gate 308, causes the received address to be read into the address store 309 provided that the instruction decoder 319 has detected that an address allocation instruction has been received. Thus the terminal 3-n detects that the allocated address is meant for that terminal by finding identity between the random number it transmitted and the random number associated with the address allocation by the controller.

Once an address has been stored in the address store 309 the terminal is capable of transmitting and receiving data, speech, or instructions to and from the controller or other terminals. It will depend on the system structure whether such transmissions have to be routed through the controller or can be made direct between the terminals connected to the transmission medium. The system structure is not limited by the inventive concept but, of course, the detailed implementation will be dependent on the system structure used.

If the random number is to be sent with every message, and not just address allocation requests, the outputs of comparators 306 and 310 will be combined in the AND gate 322 so that when the address and random number associated with a given terminal is detected the AND gate 322 produces an enable signal on line 323 to cause the functional circuits 300 to execute the received instruction. If, once an address has been allocated, only the address is transmitted and not the random number then the AND gate 322 is not required, at least for enabling the functional circuits 300.

It is, of course, an essential feature of the invention that the random number is changed in a random fashion i.e. dependent on the timing of human interactions with the terminal. Consequently there should be means for transmitting the new random number to the controller 1 either at or soon after each change or on a regular periodic basis. This may be initiated by a control routine in the controller 1 which causes each terminal to be interrogated at regular intervals to enable the controller to log the address and random number of each terminal. In this way the controller can re-allocate addresses to the terminals if it discovers that two terminals have the same address and different random numbers or if it wishes to change addresses for priority purposes.

Thus even if two terminals initially generate address requests simultaneously and have identical random numbers it is likely that the controller will be able to distinguish them after a small number of operations have been carried out since it is unlikely that two operators will consistently attempt to perform tasks at the same instant. Thus it will soon become apparent that two terminals have the same address and by use of the now different random numbers the terminal addresses can be re-allocated.

I claim:

1. A local network comprising:
    a controller connected to a transmission medium, said controller assigning an address to a terminal connected to said transmission medium in response to a received address request accompanied by a random number over said transmission medium, and transmitting said assigned address with said random number over said transmission medium;
    a plurality of terminals connected to said transmission medium, each of said terminals including:
        means for locally generating and storing a random number to be transmitted with an address request over said medium each time a specific interactive operation is performed by a human at said terminal, whereby the likelihood of generating the same random number at different terminals is reduced;
        means for transmitting an address request with said locally stored random number over said transmission medium;
        means for receiving from said controller over said transmission medium a random number appended to an assigned address; and
        means for comparing said received random number with said stored locally generated random number, whereby said appended address is identified as to whether it is the address assigned to a requesting terminal; and
    means comprised in said controller for interrogating each terminal at regular intervals to log the address and random number of each terminal.

2. A local area network comprising:
    a controller connected to a transmission medium, said controller assigning an address to a terminal connected to said transmission medium in response to a received address request accompanied by a random number over said transmission medium, and transmitting said assigned address with said random number over said transmission medium;
    a plurality of terminals connected to said transmission medium, each of said terminals including:
        means for locally generating and storing a random number to be transmitted with an address request over said medium each time a specific interactive operation is performed by a human at said terminal, whereby the likelihood of generating the same random number at different terminals is reduced;
        means for transmitting an address request with said locally stored random number over said transmission medium;
        means for receiving from said controller over said transmission medium a random number appended to an assigned address; and
        means for comparing said received random number with said stored locally generated random number, whereby said appended address is identified as to whether it is the address assigned to a requesting terminal; and
    means comprised in said controller for reallocating addresses when two terminals are detected as having the same address but different random numbers.

3. A local area network as claimed in claim 1 or 2, wherein at least one of said terminals comprises a telephone set and the means for generating a random number generates a new random number each time a telephone call is initiated on such telephone set under human control.

4. A local area network as claimed in claim 1 or 2 wherein at least one of said terminals comprises a data set, and the means for generating a random number generates a new random number each time an operator logs on and/or off said data set.

5. A local area network as claimed in claim 1 or 2, wherein the means for generating a random number operates continuously and its output is read into a store each time said specific interactive operation is performed by a human at said terminal, whereby the store contains the new random number then generated.

6. A local area network as claimed in claim 5, wherein the means for generating the random number comprises a continuously cycling counter or pseudo-random sequence generator.

7. A local area network as claimed in claims 1 or 2 in which the means for generating a random number comprises a counter driven by a clock generator, the counter outputs being connected to preset inputs of a clocked pseudo-random sequence generator of the feedback shift register type, the preset inputs being activated in response to a human interaction with the terminal.

8. A local area network as claimed in claim 1 or 2, in which each terminal comprises means for generating a new address request each time a new random number is generated.

* * * * *